Feb. 19, 1935.                J. LITTMANN                1,991,400

REGULATION OF TRANSFORMERS

Filed Aug. 21, 1933

INVENTOR
Josef Littmann
BY
Mock & Blum
ATTORNEYS

Patented Feb. 19, 1935

1,991,400

UNITED STATES PATENT OFFICE 1,991,400

REGULATION OF TRANSFORMERS

Josef Littmann, Biel, Switzerland

Application August 21, 1933, Serial No. 686,099
In Switzerland November 28, 1932

7 Claims. (Cl. 171—119)

My invention relates to a new and improved means for regulating single-phase and polyphase transformers, and to a new and improved method of accomplishing such regulation.

One of the objects of my invention is to regulate the current and voltage which is delivered by a transformer.

Another object of my invention is to improve the regulation of transformers which are used in arc welding, in order to provide the necessary abnormal voltage drop when the arc has struck, and to regulate the current in as continuous a manner as possible, within wide limits. In this respect the requirements for welding transformers are different from the requirements in other systems, in which it is desired to maintain the working current constant between certain specified limits, as for example in a series system of arc lamps.

Another object of my invention is to regulate a welding transformer (either single-phase or polyphase), so that the voltage of the arc quickly and automatically varies with and corresponds to the current, so that the danger of extinguishing the arc is greatly reduced when an alternating current is supplied thereto.

Another object of my invention is to provide a regulating system for transformers, and in particular for transformers which form part of an electrical welding system. I utilize magnetic shunt means which are regulated by adjusting the length of an air gap, without substantially changing the effective cross-section of said magnetic shunt means. That is, the regulation of the magnetic shunt means is accomplished without any change, or without any substantial change, in the effective cross-section of the air gap or of the effective cross-section of the iron or metal part of said magnetic shunt. By thus varying the reluctance of the magnetic shunt, solely by changing the length of its air gap, I can calculate and adjust the effective magnetic field which produces the secondary current, in a continuous, accurate, and precise manner.

When I refer to a welding transformer, I refer particularly to a transformer which supplies secondary current to a pair of electrodes, between which an arc is formed, so that the heat of the arc melts the electrode material (a suitable metal) and said molten material is deposited on the work. However, the invention generally applies to all transformers.

It has heretofore been proposed to use various types of magnetic shunts for regulating a transformer. For example, it has been proposed to use a slidable magnetic shunt or leakage member, which either had no air gap or which had an air gap of constant length. It has also been proposed to use a turnable member through which a part of the magnetic flux could be shunted or by-passed, and such turnable member either had no air gap or it had an air gap of constant length. This method of regulation was imperfect and subject to various disadvantages. It has also been proposed to by-pass or shunt the flux in a series of discontinuous steps by means of tap switches which were provided between a transformer coil and a supplemental coil. This system, which has been customarily used, is exemplified in Swiss Patent No. 116,397. It has also been proposed to use a choke coil which was separate from the transformer or which was built into the transformer. This method of regulation was also imperfect and it was complicated and expensive, and it resulted in a very low power factor.

It has also been proposed to use non-inductive resistances, but this produced high current consumption and low efficiency.

According to my invention, I regulate the secondary current and the voltage thereof by providing one or more movable magnetic shunt members between the primary circuit and the secondary circuit, and these magnetic shunt members are separated by means of an air gap of adjustable length. Said shunt member (or members) is actuated so that the permeability of the magnetic shunt remains constant, save for the variation which is produced by changing the length of the air gap, whose effective cross-section also remains constant. It is therefore possible to effectively regulate the voltage and amperage of the secondary current of the transformer, so that any desired current can be precisely secured within wide limits at the working voltage which is desired.

In applying my improvement to a single-phase transformer, I can provide one or more magnetic shunt members, each of which can be made of two or more parts, said shunt members having air gaps of adjustable length. In applying my improvement to three-phase transformers, I prefer to use at least two magnetic shunts. In order to provide the variable or adjustable air gap, I can move the shunt members by any suitable mechanical means, such as by means of levers, by means of screws having oppositely threaded portions, etc.

Figure 1:
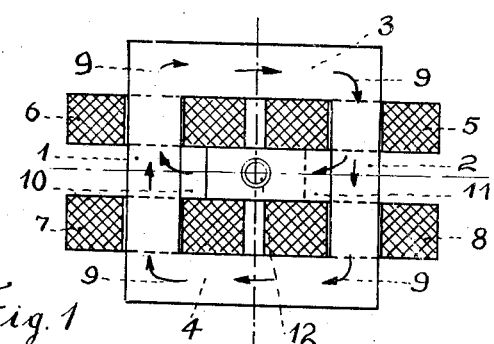
Fig. 1 is a diagrammatic top plan view of a single-phase transformer constructed according to my invention.
Figure 2:
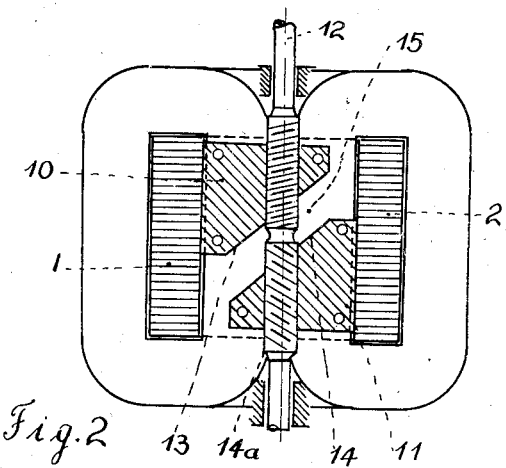
Fig. 2 is a diagrammatic cross-section of Fig. 1, in a vertical plane.

Referring to Figs. 1 and 2, the single-phase core transformer has two iron cores 1 and 2 which are connected to each other by yokes 3 and 4, in order to complete the magnetic circuit between them. The iron cores 1 and 2 carry the primary coils 5 and 6, and the secondary coils 7 and 8. When current is supplied to the primary coils, the direction of the magnetic flux is indicated by the arrows 9. Between the primary and secondary coils, I interpose a magnetic shunt or by-pass which comprises members 10 and 11 having an intermediate air gap 15 whose length can be varied. The magnetic flux can thus be by-passed through the members 10 and 11 in a regulated manner so that the amount of flux which passes through the secondary coils can be correspondingly regulated. Of course a lower voltage is induced in the secondary coil, if a larger amount of the magnetic flux is shunted. The amount of the shunted magnetic flux depends upon the reluctance of the magnetic shunt, and this reluctance depends solely upon the length of the air gap 15, because the effective cross-section of the magnetic shunt remains constant, since the movable members thereof are actuated so that they remain parallel to each other and to the cores. Hence, the reluctance is a maximum when the air gap of the magnetic shunt has maximum length, and the magnetic reluctance of the magnetic shunt is a minimum, when said air gap has minimum length. It is thus rendered possible to regulate the voltage and amperage of the secondary current in a complete and continuous manner, between maximum and minimum, in any desired range or series of ranges, solely by varying the length of the air gap of the magnetic shunt.

According to Figs. 1 and 2, the magnetic shunt for the single-phase transformer comprises separated members 10 and 11 having adjacent surfaces 13 and 14 which define the air gap. The air gap surfaces 13 and 14 are inclined to the direction in which said members 10 and 11 are moved relative to each other. The bases of said members 10 and 11 movably abut the cores 1 and 2, so as to form continuations thereof. These shunt members 10 and 11 can be moved towards each other or away from each other by means of a spindle 12 which is respectively provided at its opposite ends with a right-hand thread and a left-hand thread. Said threaded spindle 12 passes through internally threaded bores of the members 10 and 11. Hence, when the spindle 12 is turned, the members 10 and 11 are either moved towards each other or away from each other.

Figure 3:
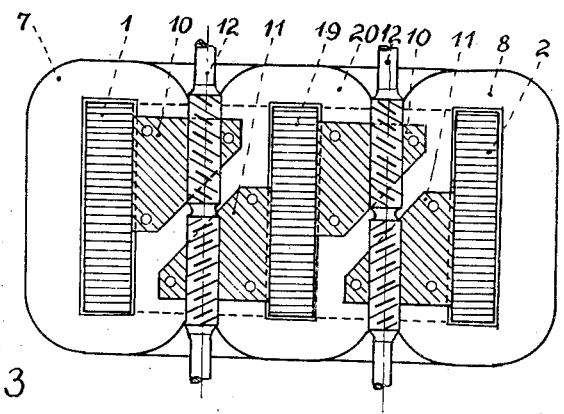
Fig. 3 is a diagrammatic cross-section of a three-phase transformer constructed according to my invention.

Fig. 3 shows a three-phase transformer which has three cores 1, 2 and 19. Likewise, Fig. 3 shows two symmetrically arranged and adjustable magnetic shunts, each of which comprises the separated and relatively movable members 10 and 11.

The invention can be applied to transformers constructed in any manner. When the members 10 and 11 are adjusted so as to regulate the length of the air gap, the flux is equally varied in the air gap and in the remainder of the magnetic shunt. Hence, heat losses are substantially suppressed. Likewise, the length of the air gap can be regulated with great precision and delicacy, because the adjustment may be as fine as may be desired. This produces an equally delicate and precise regulation of the secondary current and the voltage thereof.

If it is attempted to regulate the transformer by merely moving a magnetic shunt member so as to vary the effective cross-section of the iron path through which the flux passes, a satisfactory regulation cannot be secured, because the same amount of flux passes through the shunt member, and the only effect is to increase or decrease the flux density (but not the total flux) which passes through the magnetic shunt.

Figure 4:
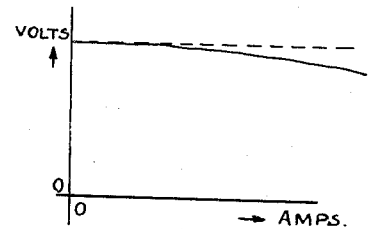
Fig. 4 shows the ampere voltage graph of a transformer of the normal type.

As shown in Fig. 4, when the resistance of the arc circuit is varied so that the secondary current varies from zero to a maximum short-circuit current, said current is greatly increased.

Figure 5:
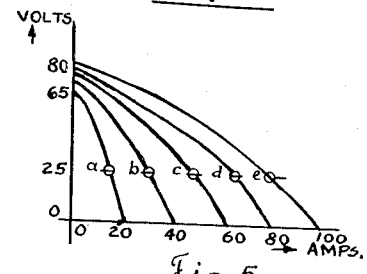
Fig. 5 shows a number of graphs which illustrate the regulation of a welding transformer according to known systems.

Referring to Fig. 5, it can be seen that the regulation could be secured only in a series of discontinuous steps according to the generally used old method. These steps are illustrated by the individual curves. If it was desired to secure an amperage at a specified voltage, which was intermediate such steps, this could not be accurately or precisely secured, and the result was to cause the molten metal to sputter and be deposited irregularly, and there was danger of extinguishing the arc.

Figure 6:
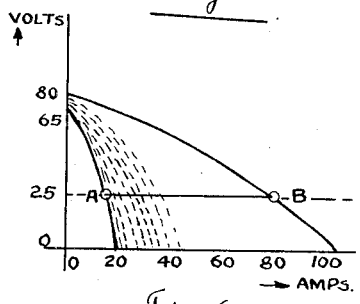
Fig. 6 shows a number of graphs which illustrate the regulation of a welding transformer according to my improved system. This illustrates how the secondary current can be increased or decreased within very wide limits, at a predetermined voltage, which may be constant.

Fig. 6 shows that an infinite number of voltage-current curves can be secured with great precision by the use of the improved method. When the arc is struck, the voltage drops sharply to the working range. The magnetic shunt is worked at low flux density, so that it is not near the saturation point.

While I prefer to maintain the cross-section of the air-gap constant, and to keep the effective cross-section of the metal part of the magnetic shunt constant, there may be some departure from these conditions without departing from the invention.

I prefer that the effective cross-section of the gap should be the same as the effective cross-section of the metal path. The reluctance of the air gap can be varied by moving only one member relative to the other, by interposing permeable means in said air gap, and in other ways. I have specified the most favorable conditions, but I do not wish to be limited thereto.

I claim:

1. Apparatus for regulating the secondary circuit of transformers, comprising, in combination with two interconnected cores and primary and secondary windings distributed on both of said cores, of a magnetic shunt placed between the primary and the secondary windings and between and across said cores and consisting of two shunt members with a free air gap between them, and means for regulating the reluctance of said air gap while maintaining the efficacious shunt section substantially constant over the whole range of regulation.

2. Apparatus for regulating the secondary circuit of transformers, comprising, in combination with two interconnected cores and primary and secondary windings distributed on both of said cores, of a magnetic shunt placed between the primary and the secondary windings and between and across said cores and consisting of two shunt members with a free air gap between them, and means for regulating the longitudinal extent of said air gap, while maintaining the efficacious shunt section substantially constant over the whole range of regulation.

3. Apparatus for regulating the secondary circuit of transformers, comprising, in combination with two interconnected cores and primary and secondary windings distributed on both of said cores, of a magnetic shunt placed between the primary and the secondary windings and between and across said cores and consisting of two shunt members with a free air gap between them, and means for producing relative movement between said shunt members so as to vary the length of said air gap, while maintaining the said shunt members in the same position with respect to the dispersion flux, so that the said shunt members permanently present substantially the same efficacious shunt section for the passage of the said flux over the whole range of regulation.

4. Apparatus for regulating the secondary circuit of transformers, comprising, in combination with two interconnected cores and primary and secondary windings distributed on both of said cores, of a magnetic shunt placed between the primary and the secondary windings and between and across said cores and consisting of two shunt members with a free air gap between them and means for producing relative movement between said shunt members so as to vary the length of said air gap while maintaining the said shunt members in the same position with respect to the dispersion flux, so that the said shunt members permanently present substantially the same efficacious shunt section for the passage of the said flux over the whole range of regulation, said shunt members having their adjacent surfaces obliquely directed with respect to the direction of their relative movement.

5. Apparatus for regulating the secondary circuit of transformers, comprising, in combination with two interconnected cores and primary and secondary windings distributed on both of said cores, of a magnetic shunt placed between the primary and the secondary windings and between and across said cores and consisting of two shunt members with a free air gap between them and means for producing relative movement between said shunt members so as to vary the length of said air gap, while maintaining the said shunt members in the same position with respect to the dispersion flux, so that the said shunt members permanently present substantially the same efficacious shunt section for the passage of the said flux over the whole range of regulation, said shunt members having abutting and sliding surfaces in contact with the cores to closely slide thereon during their relative movement.

6. Apparatus for regulating the secondary circuit of transformers, comprising, in combination with two interconnected cores and primary and secondary windings distributed on both of said cores, of a magnetic shunt placed between the primary and the secondary windings and between and across said cores and consisting of two shunt members with a free air gap between them, one of said shunt members being movable with respect to the other to vary the length of the air gap therebetween, said shunt members having guide-surfaces abutting respectively on said cores.

7. Apparatus for regulating the secondary circuit of polyphase transformers having a plurality of closed flux conducting paths separated from each other by a plurality of openings, each of these openings comprising within itself a magnetic shunt placed between the primary and secondary windings and each of such shunts consisting of a pair of relatively movable shunt members with a free air gap between them.

JOSEF LITTMANN.